United States Patent
Kirch et al.

(10) Patent No.: US 12,361,218 B2
(45) Date of Patent: Jul. 15, 2025

(54) NESTED NAMED ENTITY RECOGNITION

(71) Applicant: Cognizer, Inc., Pleasanton, CA (US)

(72) Inventors: Suzanne M Kirch, Waltham, MA (US); Rajiv Baronia, San Ramon, CA (US); Vineeth Thanikonda Munirathnam, Bangalore (IN); Jack Porter, Valley Springs, CA (US)

(*) Notice: Subject to any disclaimer, the term of this patent is extended or adjusted under 35 U.S.C. 154(b) by 0 days.

(21) Appl. No.: 18/286,900

(22) PCT Filed: Apr. 14, 2022

(86) PCT No.: PCT/US2022/024928
§ 371 (c)(1),
(2) Date: Oct. 13, 2023

(87) PCT Pub. No.: WO2022/221603
PCT Pub. Date: Oct. 20, 2022

(65) Prior Publication Data
US 2024/0193368 A1    Jun. 13, 2024

Related U.S. Application Data (60) Provisional application No. 63/176,217, filed on Apr. 16, 2021.

(51) Int. Cl.
| G06F 40/284 | (2020.01) |
| G06F 40/295 | (2020.01) |
| G06F 40/40  | (2020.01) |

(52) U.S. Cl.
CPC .......... G06F 40/295 (2020.01); G06F 40/284 (2020.01); G06F 40/40 (2020.01)

(58) Field of Classification Search
CPC .............................. G06F 40/279; G06F 40/295
(Continued)

(56) References Cited

U.S. PATENT DOCUMENTS

2019/0354582 A1* 11/2019 Schäfer ................. G06V 10/82
2020/0334410 A1* 10/2020 Yerebakan .............. G06F 40/58
(Continued)

FOREIGN PATENT DOCUMENTS

WO    WO-2019205564 A1 * 10/2019 ........... G06F 40/279
WO    WO-2020193966 A1 * 10/2020 ........... G06F 40/295
(Continued)

OTHER PUBLICATIONS

Deng, Jianfeng & Cheng, Lianglun & Wang, Zhuowei. Self-attention-based BiGRU and capsule network for named entity recognition. (Year: 2020).*
(Continued)

*Primary Examiner* — Richemond Dorvil
*Assistant Examiner* — Rodrigo A Chavez
(74) *Attorney, Agent, or Firm* — Bryan Fibel (57) ABSTRACT

Named Entity Recognition is the identification and classification of named entities within a document. Nested NEs occur when an NE is contained within another NE. The disclosed invention leverages the CapsNet architecture for improved nested NE identification and classification. This includes deriving the features of an input text. The derived features are used to identify and classify any named entities in the text. The system is further configured to identify named entities in the text and perform clustering to group named entities. The disclosed CapsNet considers the context of the whole text to activate higher capsule layers in order to identify the named entities and classify them. The teachings of this invention are applicable to other NER models to improve nested NE identification and classification.

20 Claims, 10 Drawing Sheets

(58) Field of Classification Search
USPC .......................................................... 704/1, 9
See application file for complete search history.

(56) References Cited

U.S. PATENT DOCUMENTS

| 2021/0209356 A1* | 7/2021 | Wang ................... G06V 30/416 |
| 2021/0406706 A1* | 12/2021 | Hasan ................... G06F 40/284 |
| 2022/0222069 A1* | 7/2022 | Ravindranath .......... G06N 5/04 |

FOREIGN PATENT DOCUMENTS

| WO | WO-2020261234 A1 * | 12/2020 | ........... G06F 40/284 |
| WO | WO-2021003036 A1 * | 1/2021 | ............. G06F 16/53 |
| WO | WO-2022221603 A1 * | 10/2022 | ........... G06F 40/284 |

OTHER PUBLICATIONS

Wei Zhao et al. Investigating Capsule Networks with Dynamic Routing for Text Classification. In Proceedings of the 2018 Conference on Empirical Methods in Natural Language Processing, pp. 3110-3119, Brussels, Belgium. Association for Computational Linguistics. (Year: 2018).*

Deng, Jianfeng & Cheng, Lianglun & Wang, Zhuowei. Self-attention-based BiLGRU and capsule network for named entity recognition. (Year: 2020).*

Amit Kumar Jaiswal, Prayag Tiwari, Sahil Garg, M. Shamim Hossain, Entity-aware capsule network for multi-class classification of big data: A deep learning approach. Future Generation Computer Systems, vol. 117, pp. 1-11. (Year: 2020).*

* cited by examiner

Justice  John  Smith  serves  on  the  California  Supreme  Court  405

Span 1  [  2  1  1  0  0  0  5  0  7  ]  410

| job title | name | name | 0 | 0 | 0 | location | 0 | judicial body |
|---|---|---|---|---|---|---|---|---|

Span 2  [  1  1  0  0  0  0  0  7  0  ]  415

| name | name | 0 | 0 | 0 | 0 | 0 | judicial body | 0 |
|---|---|---|---|---|---|---|---|---|

Span 3  [  1  0  0  0  0  0  7  0  0  ]  420

| name | 0 | 0 | 0 | 0 | 0 | judicial body | 0 | 0 |
|---|---|---|---|---|---|---|---|---|

Span 4  [  0  0  0  0  0  0  0  0  0  ]  425

| 0 | 0 | 0 | 0 | 0 | 0 | 0 | 0 | 0 |
|---|---|---|---|---|---|---|---|---|

$$\text{Span 1} \begin{bmatrix} 2 & 1 & 1 & 0 & 0 & 0 & 5 & 0 & 7 \end{bmatrix} \; 505$$

$$\begin{matrix} \text{cluster 1} \\ \text{cluster 2} \\ \text{cluster 3} \\ \text{cluster 4} \\ \text{cluster 5} \\ \text{cluster 6} \\ \text{cluster 7} \end{matrix} \begin{bmatrix} 0 & 1 & 1 & 0 & 0 & 0 & 0 & 0 & 0 \\ 1 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 1 & 0 & 0 \\ 0 & 0 & 0 & 0 & 0 & 0 & 0 & 0 & 0 \\ 0 & 0 & 0 & 0 & 0 & 0 & 0 & 0 & 1 \end{bmatrix} \; 510$$

$$\text{Span 2} \begin{bmatrix} 1 & 1 & 0 & 0 & 0 & 0 & 0 & 7 & 0 \end{bmatrix} \; 515$$

$$\begin{matrix} \text{cluster 1} \\ \text{cluster 2} \\ \text{cluster 3} \\ \text{cluster 4} \\ \text{cluster 5} \\ \text{cluster 6} \\ \text{cluster 7} \end{matrix} \begin{bmatrix} 1 & 1 & 1 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 1 & 1 & 0 \end{bmatrix} \; 520$$

Figure 5A $$\text{Span 3} \begin{bmatrix} 1 & 0 & 0 & 0 & 0 & 0 & 7 & 0 & 0 \end{bmatrix} \; 525$$

$$\begin{matrix} \text{cluster 1} \\ \text{cluster 2} \\ \text{cluster 3} \\ \text{cluster 4} \\ \text{cluster 5} \\ \text{cluster 6} \\ \text{cluster 7} \end{matrix} \begin{bmatrix} 1 & 1 & 1 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 1 & 1 & 1 \end{bmatrix} \; 530$$

$$\text{Span 4} \begin{bmatrix} 0 & 0 & 0 & 0 & 0 & 0 & 0 & 0 & 0 \end{bmatrix} \; 535$$

$$\begin{matrix} \text{cluster 1} \\ \text{cluster 2} \\ \text{cluster 3} \\ \text{cluster 4} \\ \text{cluster 5} \\ \text{cluster 6} \\ \text{cluster 7} \end{matrix} \begin{bmatrix} 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \end{bmatrix} \; 540$$

Figure 5B

Span 1 Expanded Matrix 605

$$\begin{bmatrix} 0 & 1 & 1 & 0 & 0 & 0 & 0 & 0 & 0 \\ 1 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 1 & 0 & 0 \\ 0 & 0 & 0 & 0 & 0 & 0 & 0 & 0 & 0 \\ 0 & 0 & 0 & 0 & 0 & 0 & 0 & 0 & 1 \end{bmatrix}$$

Span 2 Expanded Matrix 610

$$\begin{bmatrix} 1 & 1 & 1 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 1 & 1 \end{bmatrix}$$

Span 3 Expanded Matrix 615

$$\begin{bmatrix} 1 & 1 & 1 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 1 & 1 & 1 \end{bmatrix}$$

Span 4 Expanded Matrix 620

$$\begin{bmatrix} 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \end{bmatrix}$$

Combined Matrix Output 625

$$\begin{bmatrix} 1 & 1 & 1 & 0 & 0 & 0 & 0 & 0 & 0 \\ 1 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 1 & 0 & 0 \\ 0 & 0 & 0 & 0 & 0 & 0 & 0 & 0 & 0 \\ 0 & 0 & 0 & 0 & 0 & 0 & 1 & 1 & 1 \end{bmatrix}$$

NESTED NAMED ENTITY RECOGNITION

CROSS REFERENCE TO RELATED APPLICATIONS

This application claims priority from provisional U.S. patent application No. 63/176,217 filed on Apr. 16, 2021.

FIELD OF THE INVENTION

Embodiments of the invention generation relate to natural language processing, more particularly to nested named entity recognition.

BACKGROUND

Semantic parsing is the task of transforming Natural Language text into a machine readable formal representation. Natural language processing (NLP) involves the use of artificial intelligence to process and analyze large amounts of natural language data. Named Entity Recognition (NER) is the identification and classification of named entities within a document. Traditionally, an NER model identifies the named entity (NE) as belonging to a class in a predefined set of classes. Possible classifications of named entities in different NER models include person, location, artifact, award, media, team, time, monetary value, etc. Named Entity Disambiguation (NED) is the process of identifying unique entities within a document.

An NER model helps identify key information to understand what a document is about, either as text summarization or as a starting point for additional processing. Additionally, NER can be used to identify how to correctly handle data in a given document based on a specific named entity or a named entity class. For example, if the primary named entity in a document is a person, certain security measures may need to be taken for the data.

Nested NEs occur when an NE is contained within another NE. For example, the named entity "California Supreme Court" contains a location entity "California" within it. Most NER models identify the longest span or topmost named entity. By not identifying nested NEs, information is lost, such as the location classification in the "California Supreme Court" example. Nested NER can be used in biology and chemistry in the identification of proteins, DNA and RNA, and other compounds.

Common NER models utilize a Bidirectional Long Short Term Memory (BiLSTM) encoder and Conditional Random Field (CRF) decoder. Bidirectional LSTMs consist of a pair of LSTMs, where one is trained from left-to-right (forward) and the other is trained from right-to-left (backward). However, because they are two separate LSTMs, neither of them look at both directions at the same time and thus are not truly bidirectional. Each LSTM can only consider the context on one side of the NE at a time. The model is not able to consider the full context of the named entity to efficiently determine the correct class that the named entity belongs to.

Nested NER models can involve the identification of entity boundaries and the identification of NEs within the boundaries. Some Nested NER models use a labeling, such as BILOU, whereby each word in an NE string is labeled as the beginning, inside, last, outside, or unit of the string, and use multiple labels to identify NEs within NEs. There exist Nested NER models that dynamically run stacks of flat NER models that identify NEs of increasing span until no outer entities are extracted.

Capsule Neural Networks (CapsNet) are machine learning systems that model hierarchical relationships. CapsNets were introduced in the image classification domain, where they are configured to receive as input an image and to process the image to perform image classification or object detection tasks. CapsNet improves on Convolutional Neural Networks (CNN) through the addition of the capsule structure and is better suited to outputting the orientation of an observation and pose of an observation compared to CNN. Thus, it can train on a comparatively lesser number of data points with a better performance in solving the same problem. The dynamic routing algorithm groups capsules together to activate higher level parent capsules. Over the course of iterations, each parents' outputs may converge with the predictions of some children and diverge from those of others, thus removing a lot of unnecessary activations in the network, ultimately until the capsules reach an agreement.

SUMMARY

Named Entity Recognition is the identification and classification of named entities within a document. Nested NEs occur when an NE is contained within another NE. The disclosed invention leverages the CapsNet architecture for improved nested NE identification and classification. This includes deriving the features of an input text. The derived features are used to identify and classify any named entities in the text. The system is further configured to identify named entities in the text and perform clustering to group named entities. The disclosed CapsNet considers the context of the whole text to activate higher capsule layers in order to identify the named entities and classify them. The teachings of this invention are applicable to other NER models to improve nested NE identification and classification, A computer-implemented method for identifying and classifying nested named entities in a natural language text is provided. This includes receiving, into a stack of neural capsule embedding networks comprised of M number of flat neural capsule embedding networks, an embedding vector as input, where the embedding vector contains embeddings representing words in a natural language text and each neural capsule embedding network is configured to identify named entities of an assigned span length, 1 through M. Each neural capsule embedding network simultaneously analyzes the context of each word within the embedding vector considering tokens to the left and right of the word. Through dynamic routing of capsules, each neural capsule embedding network simultaneously converges to a final capsule layer mapping to each word in the input vector. An output vector is generated from each neural capsule embedding network simultaneously, wherein each output vector value identifies if a word span, of the neural capsule embedding network's assigned span length, in the input is a named entity or not a named entity and if the word span is a named entity, identifies what class the named entity belongs to. The classes can be a predefined set of named entity classes or clusters determined by the neural capsule embedding networks.

The input can be a natural language text, where the words in the natural language text are converted into embeddings and inserted into an embedding vector during pre-processing. The features of the natural language text can be identified during pre-processing. The features can be included in the embedding vector as feature embeddings. The features can also be identified by the Neural Capsule Embedding Network.

BRIEF DESCRIPTION OF THE DRAWINGS

The accompanying drawings taken in conjunction with the detailed description will assist in making the advantages and aspects of the disclosure more apparent.

DETAILED DESCRIPTION OF THE INVENTION

Reference will now be made in detail to the present embodiments discussed herein, illustrated in the accompanying drawings. The embodiments are described below to explain the disclosed method, system, apparatus, and program by referring to the figures using like numerals.

The subject matter is presented in the general context of program modules and/or in computer hardware, including the structures disclosed in this specification and their structural equivalents, or in combinations of one or more of them. Those skilled in the art will recognize that other implementations may be performed in combination with other types of program and hardware modules that may include different data structures, components, or routines that perform similar tasks. The invention can be practiced using various computer system configurations and across one or more computers, including, but not limited to, clients and servers in a client-server relationship. Computers encompass all kinds of apparatus, devices, and machines for processing data, including by way of example one or more programmable processors, memory, and can optionally include, in addition to hardware, computer programs and the ability to receive data from or transfer data to, or both, mass storage devices. A computer program, which may also be referred to or described as a program, software, a software application, an app, a module, a software module, a script, or code, can be written in any form of programming language, including compiled or interpreted languages, or declarative or procedural languages; it can be deployed in any form, including as a stand-alone program or as a module, component, subroutine, or other unit suitable for use in a computing environment deployed or executed on one or more computers.

Unless otherwise defined, all terms (including technical and scientific terms) used herein have the same meaning as commonly understood by one having ordinary skill in the art to which this invention belongs. In describing the invention, it will be understood that a number of techniques and steps are disclosed. Each of these has individual benefits, and each can also be used in conjunction with one or more, or in some cases all, of the other disclosed techniques. Accordingly, for the sake of clarity, this description will refrain from repeating every possible combination of the individual steps in an unnecessary fashion. The specification and claims should be read with the understanding that such combinations are entirely within the scope of the invention and the claims.

It will nevertheless be understood that no limitation of the scope is thereby intended, such alterations and further modifications in the illustrated invention, and such further applications of the principles as illustrated therein being contemplated as would normally occur to one skilled in the art to which the embodiments relate. The present disclosure is to be considered as an exemplification of the invention, and is not intended to limit the invention to the specific embodiments illustrated by the figures or description below.

System, method, apparatus, and program instruction for Nested Named Entity Recognition is provided. Such an invention allows for the more efficient processing of natural language data. While some embodiments of the disclosed invention leverage the CapsNet architecture for improved nested NE identification and classification, the teachings of this invention are applicable to other NER models to improve nested NE identification and classification, including, without limitation, NED models. The system can be further configured to identify named entities in the text and perform clustering to group named entities. Clustering allows for the creation of new classes that might have been previously missed and the splitting of existing classes to classify named entities more specifically. An explanation for identifying and classifying nested named entities follows.

Figure 1:
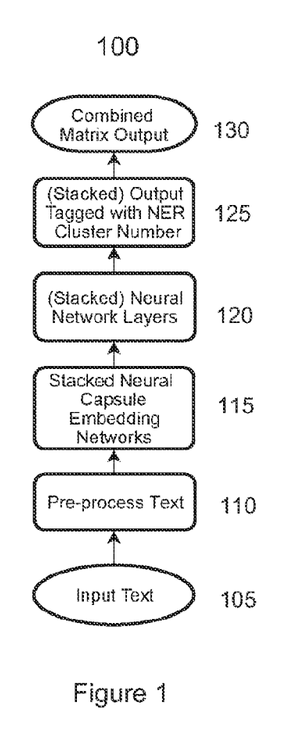
FIG. 1 depicts a Nested NER system embodiment configured to identify and classify nested named entities in a natural language input.

As illustrated in FIG. 1, a disclosed system 100, configured to identify and classify nested named entities, is provided. Such a system can have installed on it software, firmware, hardware, or a combination of them that in operation causes the system to perform operations or actions. The system receives a natural language input 105 stored in memory or accessed from another computer. This disclosure contemplates different natural language text lengths and formats as input. The input sentence in the depicted embodiment is an example, and no limitation is intended.

In the preferred embodiment, the input is pre-processed 110 using different NLP libraries to identify features of the natural language text that will be provided to and used by CapsNets. This includes linguistic and semantic features of the text. Instead of assuming that the model can pick up all features on its own, the inclusion of linguistic features in the capsules ensures that the model can use all of the features to better identify and classify named entities in the text. The text is fed through parsers to determine these NER features, which can be divided into two subsets of features: features for NE identification and features for NE classification. NE identification features include, but are not limited to, part of speech tags, constituency parsing, relations between words, and conjunctions. NE classification features include, but are not limited to, dependency relations, prepositions, and object types. In the embodiments where NED is performed along with NER, NED features, including, but not limited to, part of speech tags and dependency relations, are also determined during pre-processing.

The input text is passed to a stack of Neural Capsule Embedding Networks 115. The number of flat Neural Capsule Embedding Network models that comprise the stack is equal to a defined maximum span length value. In the preferred embodiment, the defined maximum span length is 32, and thus there are 32 flat models in the stack, though no limitation is intended. Each flat Neural Capsule Embedding Network is configured with a span length, 1 through 32. The Neural Capsule Embedding Networks consider the context of the input text to activate higher capsule layers in order to identify and classify named entities of their configured span length. The flat models are run simultaneously, each producing a vector output.

For each Neural Capsule Embedding Network, a Neural Network Layer 120 performs post-processing on the output vector. The system generates output vectors 125. For each named entity span in the vector, the leftmost/first word is tagged as either 0, indicating that the corresponding word span is not a named entity, or an integer between 1 and 1000, indicating that the corresponding word span is a named entity, where the integer value corresponds to the class with which the named entity is grouped. In the preferred embodiment, because only the leftmost/first word of a named entity is tagged with an integer greater than 0, values of 0 in the output vector may still correspond to words that are part of a named entity for word spans greater than 1. While the disclosed model supports a predefined set of named entity classes, the preferred embodiment supports a defined maximum number of undefined classes, termed clusters in this disclosure. The clusters are groupings where the categories are later identified through post-processing. The preferred embodiment has a defined maximum of 1000 clusters, such that the output vector values of named entities are integers 1 to 1000, corresponding to the cluster. A smaller defined maximum number of clusters will result in clusters similar to traditional models and will result in a smaller output matrix. A larger defined maximum number of clusters will result in a finer level of granularity in the classification of named entities, as compared to traditional NER models. No limitation is intended on the defined maximum number of clusters or the use of a predefined set of named entity classes. The output vectors are combined to create a combined matrix output 130.

Figure 2:
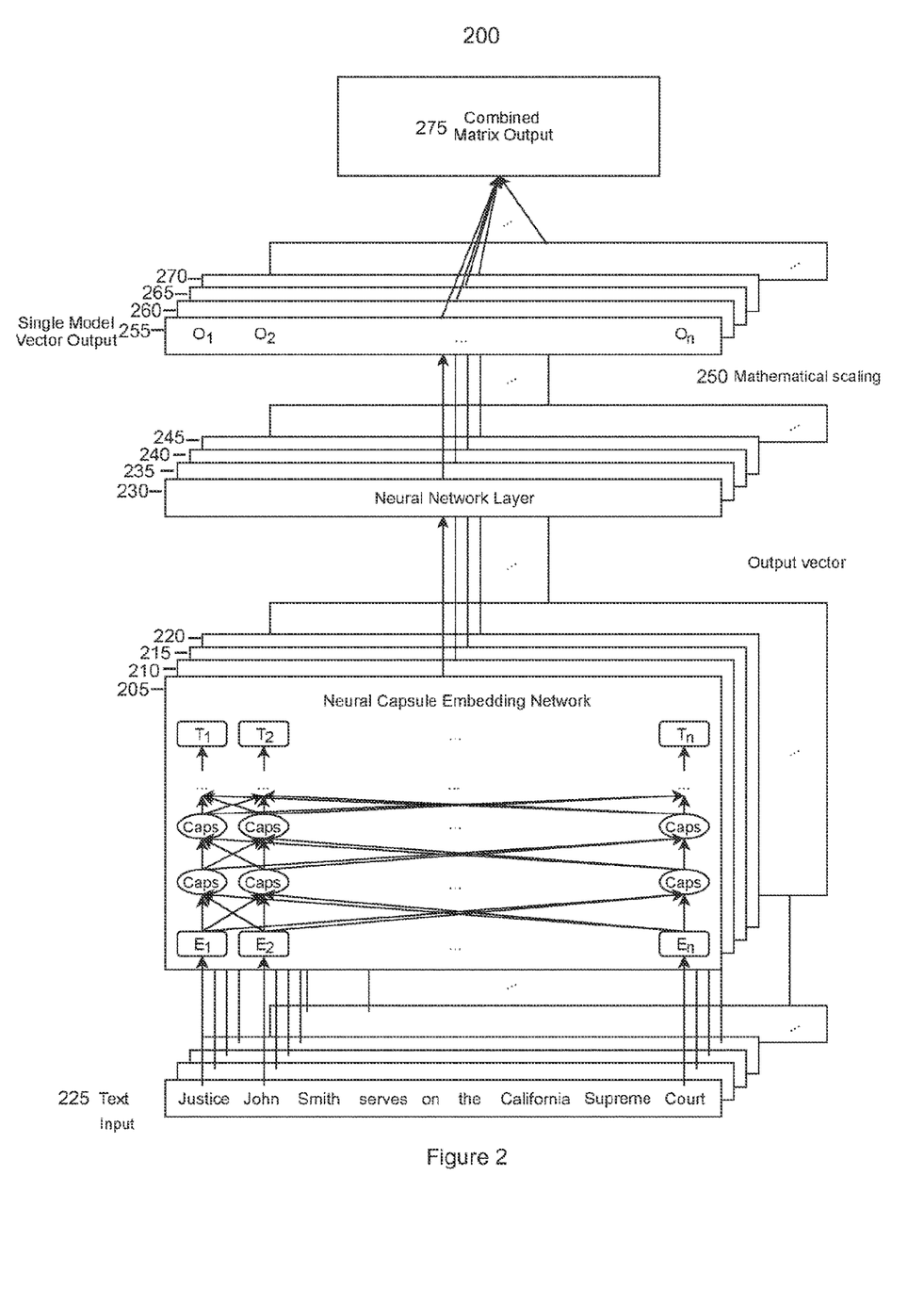
FIG. 2 depicts a Nested NER Capsule Network embodiment configured to identify and classify nested named entities in a natural language input.

As illustrated in FIG. 2, a Nested NER Capsule Network embodiment 200, configured to identify and classify named entities, is provided. A Nested NER Capsule Network, appropriately configured in accordance with this specification, can perform the disclosed processes and steps. The processes and steps described below can be performed by one or more computers or computer components or one or more computer or computer components executing one or more computer programs to perform functions by operating on input and generating output.

In the depicted embodiment, a stack of Neural Capsule Embedding Networks is comprised of M flat Neural Capsule Embedding Networks. Each Neural Capsule Embedding Network is configured to identify and classify named entities having a specific span length. M is a defined maximum span length, which is 32 in the preferred embodiment, such that the 32 Neural Capsule Embedding Networks are each configured to an assigned span length of 1 through 32. A Neural Capsule Embedding Network configured to span length 1 205 is tasked with identifying 1 word span named entities. A Neural Capsule Embedding Network configured to span length 2 210 is tasked with identifying 2 word span named entities. A Neural Capsule Embedding Network configured to span length 3 215 is tasked with identifying 3 word span named entities. A Neural Capsule Embedding Network configured to span length 4 220 is tasked with identifying 4 word span named entities, and so on. The M Neural Capsule Embedding Networks run simultaneously.

Each flat Neural Capsule Embedding Network is a CapsNet configured to receive a natural language text 225 as input in the depicted embodiment. Natural language text is comprised of one or more words, exemplified by the sentence, "Justice John Smith serves on the California Supreme Court." Because neural networks cannot read and understand text, the data is converted into numerical representations called embeddings. In the preferred embodiment, the Neural Capsule Embedding Networks are designed to accept a vector length of 512 embeddings ($I_L$). When receiving an input less than 512 words in length, embeddings following the text (that do not correspond to a word) are populated with the value of zero. Thus, for the example sentence "Justice John Smith serves on the California Supreme Court," 9 embeddings having values corresponding to the words and 503 embeddings having value 0, comprise the embedding vector. This disclosure contemplates Neural Capsule Embedding Networks having alternative maximum and minimum length embedding vectors as well as those capable of receiving variable length embedding vectors. This disclosure contemplates the conversion of natural language data to embeddings by the Neural Capsule Embedding Networks or as part of pre-processing where the Neural Capsule Embedding Networks would receive the embedding vector as input. The conversion of natural language data to embeddings can be local to the Neural Capsule Embedding Networks or separate. The format of the embedding vector can vary to additionally include other values that the system may use (with appropriate delimiters), but should contain the words of the input natural language text as embedding tokens. In the preferred embodiment, each word embedding in the embedding vector is itself a vector.

Embodiments can vary in whether the features, to be evaluated by the Neural Capsule Embedding Networks, are identified during pre-processing or by the Neural Capsule Embedding Networks themselves. In the preferred embodiment, the features of the text are identified during pre-processing and fed into the Nested NER model or directly into each flat Neural Capsule Embedding Network. The features are converted to numerical representations and included with each word embedding that the feature is relevant to, as feature embeddings, where each embedding in the embedding vector is itself a vector. The feature embeddings in the embedding vector will be in the same order for each word. For each word, any feature embeddings for features that are not relevant to a word are populated with the value of zero in order for the embedding vector for each word to be the same dimension. Alternatively, the features can be identified in the first step in the capsule networks.

Each Neural Capsule Embedding Network 205, 210, 215, 220 is comprised of layers of capsules, where each capsule is initially linked to every other capsule in the adjacent layers, though these connections are pared down as a result of dynamic routing. The Neural Capsule Embedding Networks are true CapsNets and not merely a limited number of capsule layers. Because increasing the number of capsule layers above certain thresholds can saturate the network, in the preferred embodiment, the maximum number of capsule layers is determined during training. The maximum number of capsule layers can be the same for all Neural Capsule Embedding Networks in the stack or can vary according to the assigned span length of each Neural Capsule Embedding Network. This disclosure contemplates Neural Capsule Embedding Networks of all sizes and across one or more computers.

The networks are configured, for each word, to analyze and consider the tokens on both the left and right sides of the word to fully understand the context within the sentence. In the preferred embodiment, at least 10 tokens to the left (before) and 10 tokens to the right (after) of each word are considered, via capsule connections, in order to determine if the word falls within a word span that is a named entity and to determine the cluster of an identified named entity. In Neural Capsule Embedding Networks configured to identify named entities of longer span lengths, the number of tokens to the left and right of each word that is considered may be larger. For example, the 25 span length Neural Capsule Embedding Network may consider 15 tokens to the left and 15 tokens to the right of each word. This is so that if the input text contains a 25 word named entity, the 25 span CapsNet is still able to identify the named entity in the context of the input text by looking at the words to the left and right of the named entity. Considering tokens to the left and right of each word is an improvement over prior art processes which do not look at the words in both directions or, in implementations using Bidirectional LSTMs, which look to the left and right of the word separately and are not truly bidirectional.

In the preferred embodiment, each capsule layer in the network has a hidden size of 2048 ($H_L$), though other sizes may be contemplated. Upon receiving the input, an intermediate hidden neural layer converts the input embedding size of $I_L$ to hidden size of $H_L$ and projects it to the hidden capsule layers. The final layer of each Neural Capsule Embedding Network is a Fully Connected Capsule Layer. The hidden layer before the Fully Connected Capsule Layer produces a matrix of dimension $I_L \times H_L$. The matrix is flattened (all elements of the matrix placed in a single row) to a vector of dimension $1 \times I_L * H_L$ and passed to the Fully Connected Capsule Layer. The Fully Connected Capsule Layer converts the $1 \times I_L * H_L$ vector to one having dimensions of $1 \times I_L$, the $1 \times I_L$ output vector corresponding to the input embedding vector.

Alternatively, the Neural Capsule Embedding Networks can each be configured to produce an output matrix of dimension $I_L \times H_L$. Each matrix is flattened to a vector of dimension $1 \times I_L * H_L$ and passed to their respective Fully Connected Layer. In such alternative embodiments, each Fully Connected Layer is separate from their respective Neural Capsule Embedding Network and can comprise one or more computers, components, or program modules, residing local to the Neural Capsule Embedding Networks or separate. Each Fully Connected Layer converts the $1 \times I_L * H_L$ vector to one having dimensions of $1 \times I_L$, the $1 \times I_L$ output vector corresponding to the input embedding vector.

The Neural Capsule Embedding Networks are trained on a corpus of text to produce output according to their configured span length. Training is done by passing a known input, generating an output using the networks as they currently are, then comparing it to the known correct output, and modifying the parameters (weights) accordingly to improve the accuracy of the results. In the preferred embodiment, the capsules and capsule connections are randomly initialized. Over time, the networks are trained to generate the known output for all natural language data input. For each span length, there is a different loss calculation, and each model will be trained according to the loss calculation for its configured span length. Each model can be trained individually, where each singular model is trained with its own loss calculation. Alternatively, all of the models can be trained by combining the loss calculations from all of the models. Where the models are trained in combination, the outputs of all the models are combined, and then optional additional capsule layers are trained. Training can be supervised, whereby there is a predefined set of named entity classes, and the system is configured to group any recognized named entities into the appropriate class. In the preferred embodiment, training is unsupervised, whereby there is a defined maximum number of clusters, and the system is configured to group any recognized named entities into as yet unidentified clusters. The clusters can later be identified during some form of post-processing.

Figure 3:
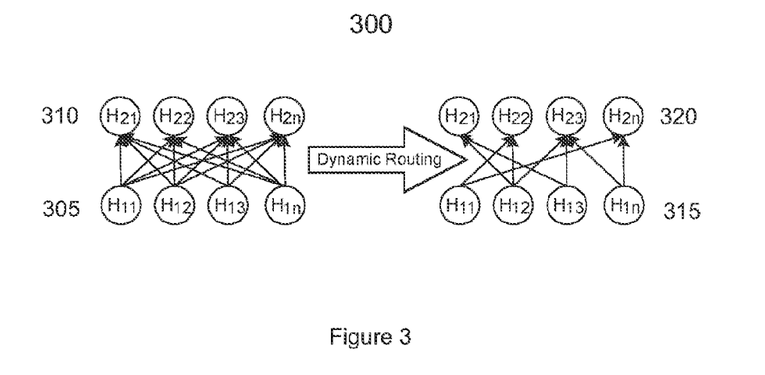
FIG. 3 depicts the dynamic routing of capsules between layers in a capsule network.

As depicted in FIG. 3, dynamic routing of capsule networks 300 is the process whereby connections between lower level and higher level capsules are activated based on relevance to each other. Before dynamic routing, each capsule in a lower layer 305 is connected to each capsule in the layer above 310. Over the course of training, extraneous connections between capsules in a lower layer 315 and a higher layer 320 are identified and removed so that only the relevant connections remain. Capsules in a capsule layer can activate depending on their input data. Upon activation, the output of a lower capsule is routed to one or more capsules in the succeeding higher layer, abstracting away information while proceeding bottom-up. Capsules in a given capsule layer are configured to receive as input capsule outputs of one or more capsules of a previous capsule layer. The dynamic routing algorithm determines how to route outputs between capsule layers of the capsule network. As the capsules independently agree and converge to activate fewer and fewer higher level parent capsules, the overall complexity of the network at higher levels is reduced. Note that in a CapsNet, the higher layer capsules do not know what they represent in advance, so there is no prior assumption regarding the representations of higher layer capsules. Whereas for other architectures, such as those based on transformers, all layers have the same number of nodes, and the number of nodes is precisely the number of input tokens.

CapsNets are commonly employed in image recognition and classification due to their understanding of the spatial relationships of features in an image. For the image recognition process, CapsNet architecture involves capsules that take into consideration things like color, gradients, edges, shapes, and spatial orientation to identify object features and recognize the position and location of the features. As capsules agree on the features of the image, the output is routed to subsequent layers to the eventual identification of the image.

For Named Entity Recognition, the disclosed CapsNets are trained to analyze the input by evaluating features of a token in the context of the input natural language text, such features including, but not limited to, part of speech tags, constituency parsing, relations between words, and conjunctions. The disclosed CapsNets are further trained to group a named entity into clusters by evaluating features of the named entity in the context of the text, such features including, but not limited to, dependency relations, prepositions, and object types. Embodiments can vary in whether the features to be evaluated by the CapsNets are identified during pre-processing or by the CapsNets themselves. As capsules agree on the relevant features for identifying a named entity, the output of whether a word is possibly a named entity or not a named entity is routed to subsequent layers. The capsules further agree on the relevant features used to classify a named entity and route the output of potential clustering of a named entity to subsequent layers. At their final capsule layer, each Neural Capsule Embedding Network outputs a vector, corresponding to the input text in the depicted embodiment, though the Neural Capsule Embedding Networks can be configured to produce other outputs.

As depicted in FIG. 2, the output vectors are passed through a stack of Neural Network Layers 230, 235, 240, 245, comprised of M flat Neural Network Layers. Such Neural Network Layers can comprise one or more computers, components, or program modules and can reside local to the Neural Capsule Embedding Networks or separate. The Neural Network Layers perform a function that transforms and normalizes the values in the output vectors. This can be done by a sigmoid function, which produces values ranging between 0 and 1, or a tanh function, which produces values ranging between −1 and 1, but other functions may be performed, and no limitation is intended. The values in the vectors are mathematically scaled 250 to integers 0 to the defined maximum number of clusters, which is 1000 in the preferred embodiment. A 0 indicates that the word is not the leftmost/first word of a named entity, and 1 through 1000 indicates the cluster to which the corresponding named entity belongs. If the range of values after the Neural Network Layers is 0 to 1, this can be performed with scalar multiplication. In some embodiments, as part of the mathematical scaling 250, a ceiling function or some other rounding function can be used to ensure that the mathematical scaling results in integer values. A ceiling function would be preferred to a floor function to prevent values below 1 that should be recognized as a leftmost/first word of an NE from being rounded to 0 and thus not recognized as a leftmost/first word of an NE. In alternative embodiments, the Neural Network Layer functionalities and mathematical scaling functionalities can be performed by the Neural Capsule Embedding Networks or after each layer in the Neural Capsule Embedding Networks.

A stack of M output vectors 255, 260, 265, 270, each output vector corresponding to the input text size $I_L$, is produced. The output vectors are combined to create a combined matrix output 275.

Figure 4:
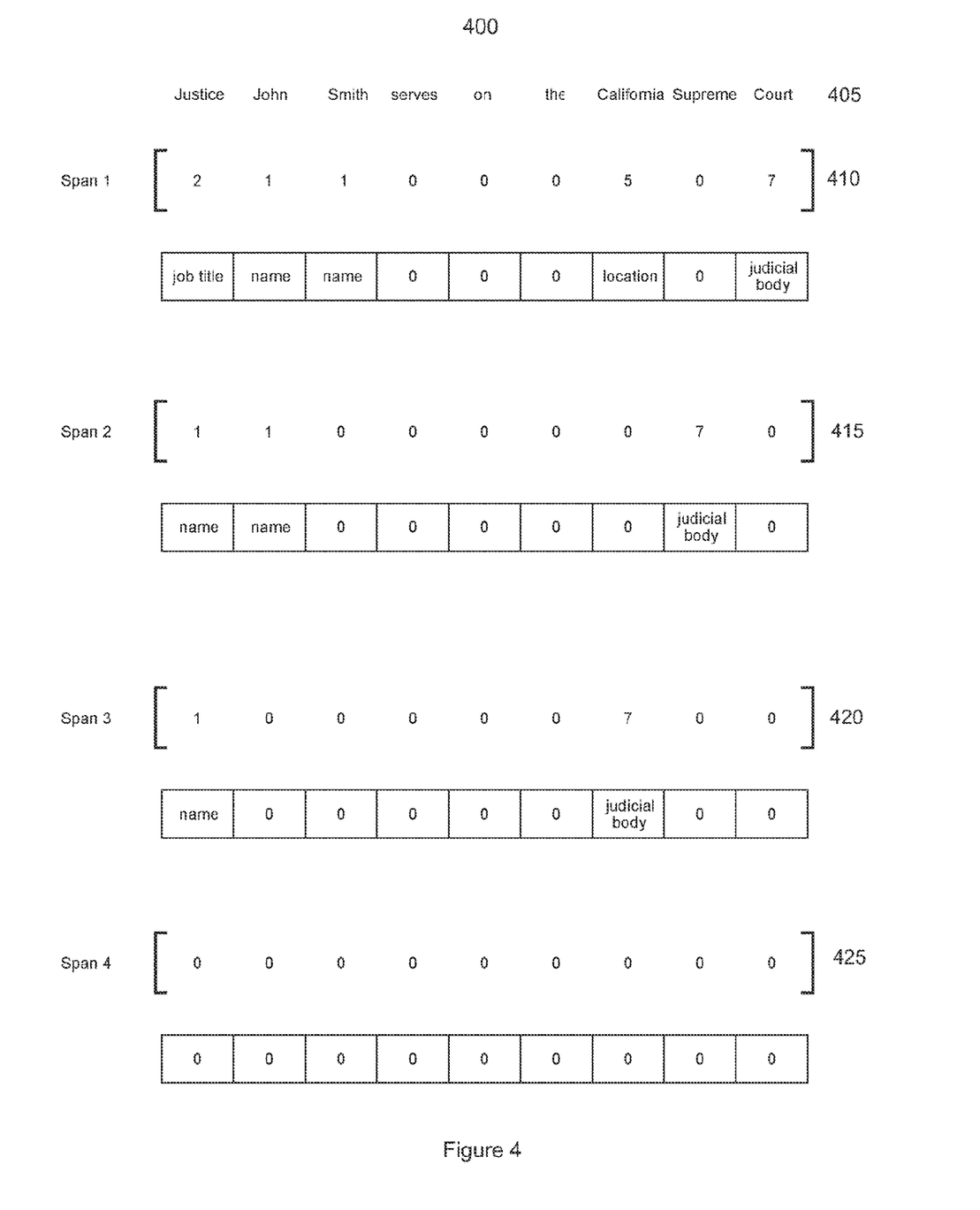
FIG. 4 depicts output vectors produced by the Nested NER Capsule Network.

As illustrated in FIG. 4, output 400 generated by the Nested NER Model is provided. In the preferred embodiment, output vectors are generated corresponding to the input text 405. For each named entity span in the vector, the leftmost/first word is tagged as either 0, indicating that a word span is not a named entity, or an integer between 1 and 1000, specifying the cluster to which the named entity belongs. In the preferred embodiment, because only the leftmost/first word of a named entity is tagged with an integer greater than 0, values of 0 in the output vector may still correspond to words that are part of a named entity for word spans greater than 1. An output vector 410 is produced by the 1 word span NER model from the example sentence, "Justice John Smith serves on the California Supreme Court." The value 2 identifies a job title cluster (Justice), the value 1 indicates a name cluster (John and Smith), the value 5 indicates a location cluster (California), the value 7 indicates a judicial body cluster (Court), and the value 0 identifies that the word is not a named entity. An output vector 415 is produced by the 2 word span NER model from the example sentence. For a span length greater than 1, the vector output is left justified so that the cluster number for a named entity is in the vector position corresponding to the first word of the span. The value 1 indicates a name cluster (Justice John and John Smith), the value 7 indicates a judicial body cluster (Supreme Court), and the value 0 identifies that the word is not the leftmost/first word of a named entity. An output vector 420 is produced by the 3 word span NER model from the example sentence. The value 1 indicates a name cluster (Justice John Smith), the value 7 indicates a judicial body cluster (California Supreme Court), and the value 0 identifies that the word is not the leftmost/first word of a named entity. An output vector 425 is produced by the 4 word span NER model from the example sentence. Because there are no named entities of span length 4, the output vector only contains the value 0.

Figure 5A:
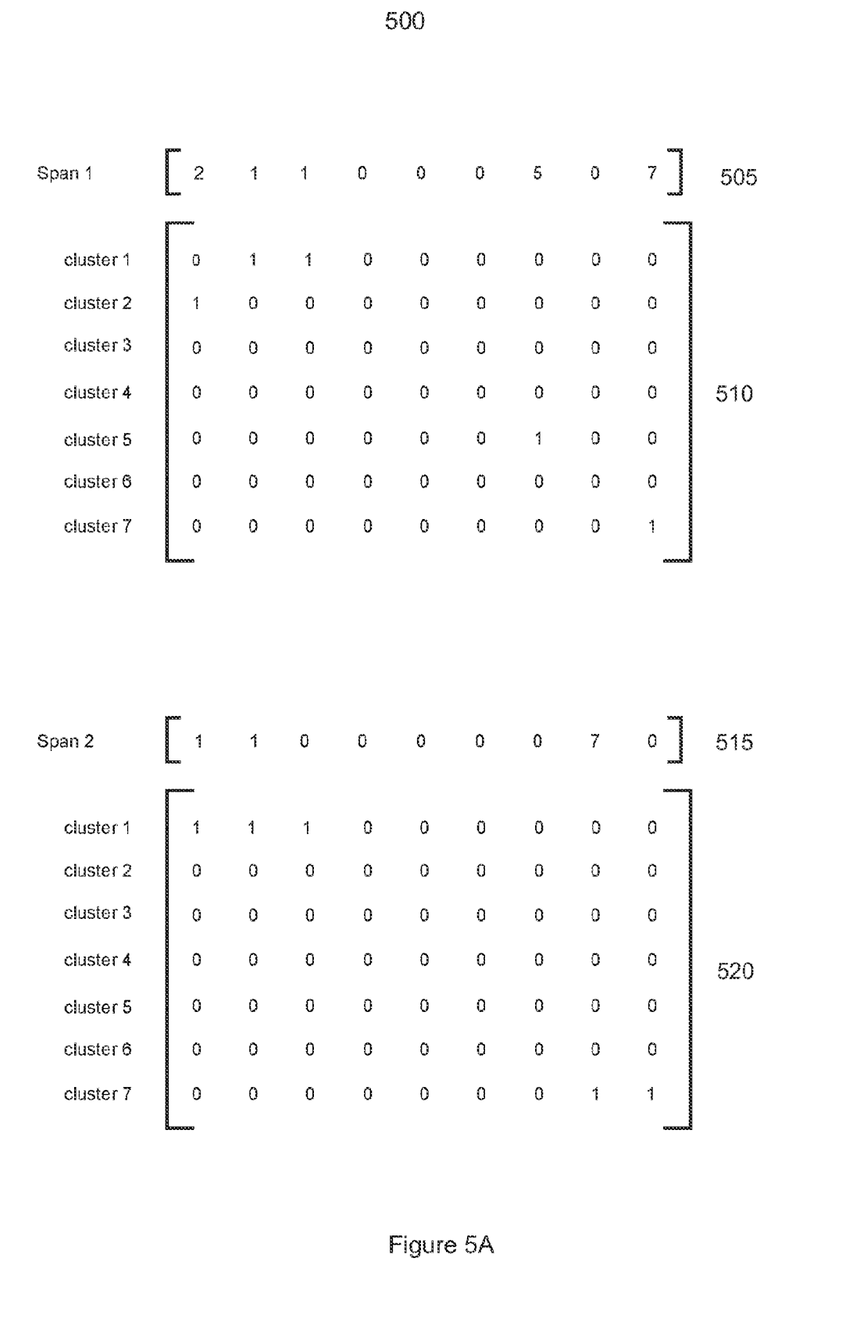
FIGS. 5A and 5B depict a process of converting the output vectors to matrices.
Figure 5B:
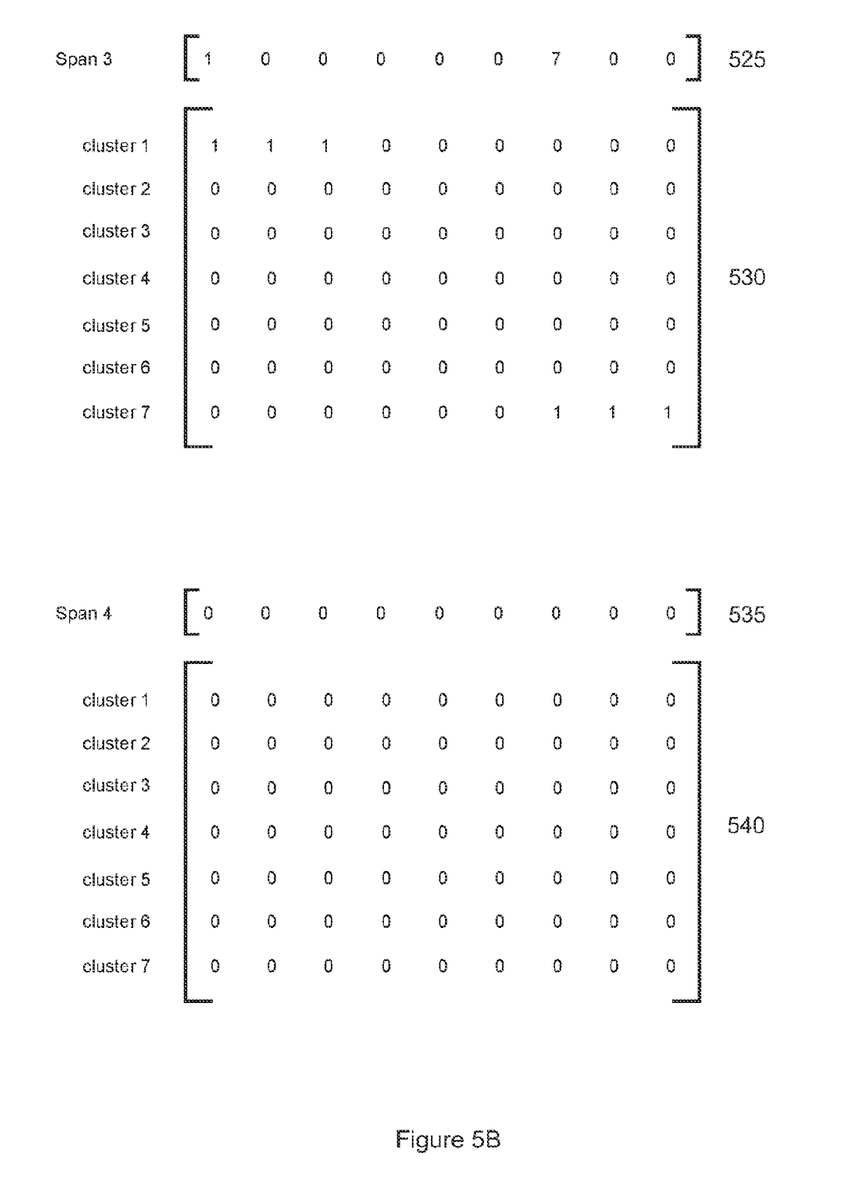

As illustrated in FIGS. 5A and 5B, a process 500 of converting the span vectors 505, 515, 525, 535 to span matrices 510, 520, 530, 540 is provided. Each vector is expanded to create an expanded span matrix. The matrices have dimensions of the defined maximum number of clusters×input text length. The columns correspond to the location of the words in the input text. The rows correspond to the cluster number. For each non-zero integer value in the vector, a 1 is inserted in a matrix cell, where the column is the position of each word in the span and the row is the cluster number corresponding to that NE. All other values in the matrix are 0. Thus, for the first vector value, a 2, in the span 1 output vector 505, a 1 is inserted into the cell of column 1 (input text position) and row 2 (cluster number) of the span 1 matrix 510. While the output vectors are left justified, such that a value for a span is only inserted into the vector at the position of the first word of the span, a 1 is inserted into each column of the span in the matrix row for the identified cluster of the named entity. Thus, for the first vector value, a 1, in the span 3 output vector 525, a 1 is inserted into the cells of columns 1, 2, and 3 (input text position) and row 1 (cluster number) of the span 3 matrix 530.

Figure 6:
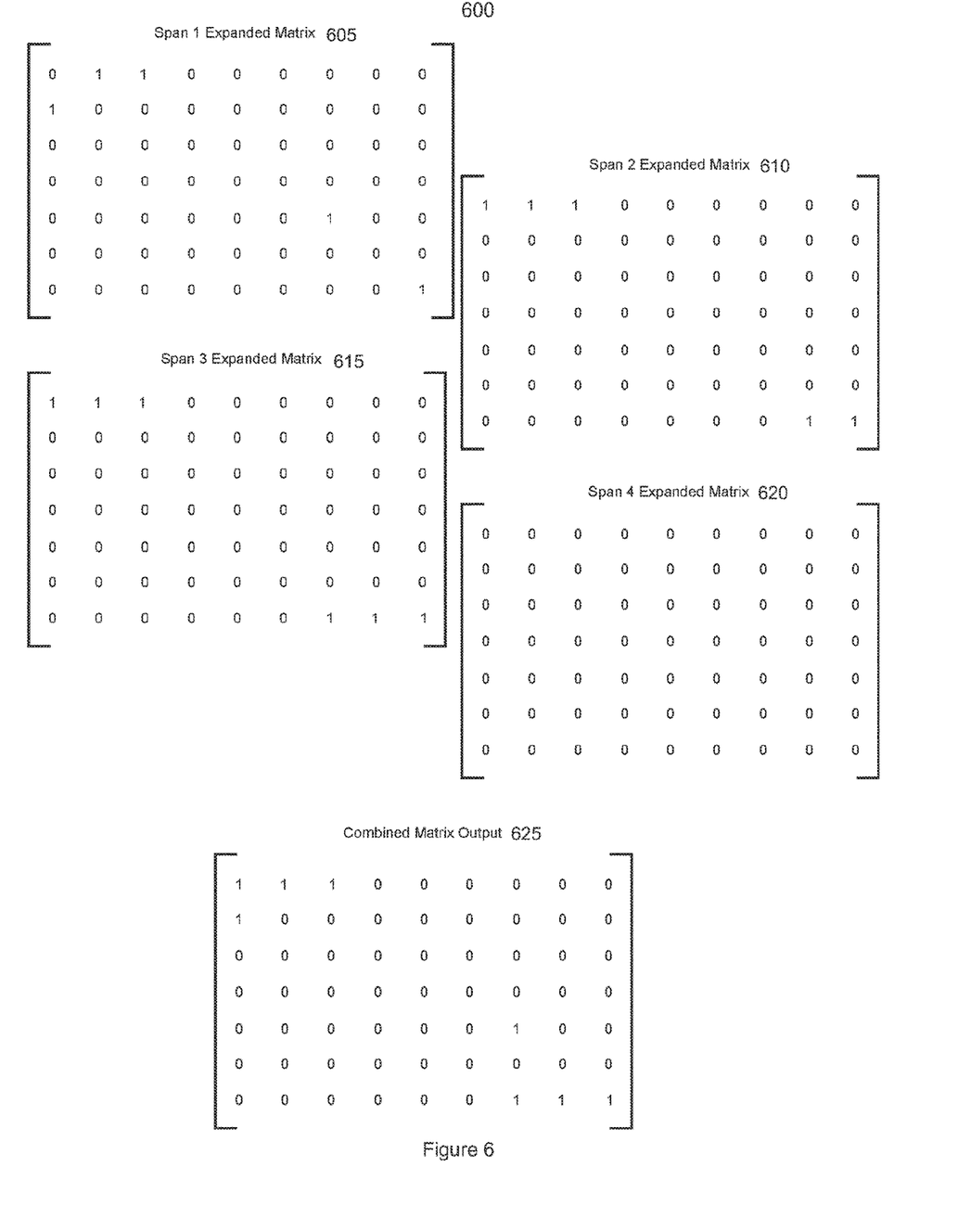
FIG. 6 depicts a process of combining the matrices to produce a combined matrix output.

As illustrated in FIG. 6, a process 600 of converting the expanded matrices to a combined matrix, is provided. The combined matrix has the same dimensions as the expanded matrices. The columns correspond to the location of the words in the input text. The rows correspond to the cluster number. The span matrices are combined into a single matrix by comparing, for each cell location, the values across all matrices. If at least one expanded matrix contains a 1 at a cell location, a 1 is inserted into the combined output matrix at that cell location. Otherwise, if all values are 0 at a cell location, a 0 is inserted into the combined output matrix at that cell location. Thus, to determine the value of the top left cell of the combined matrix, the top left cell of each expanded span matrix is looked at. A value of 0 for the span 1 matrix 605, a value of 1 for the span 2 matrix 610, a value of 1 for the span 3 matrix 615, and value of 0 for the span 4 matrix 620 results in a value of 1 inserted into the top left cell of the combined matrix output 625. The combined matrix displays that, for the example input, the word Justice is part of two named entities: a job title Justice and a name Justice John Smith.

Figure 7:
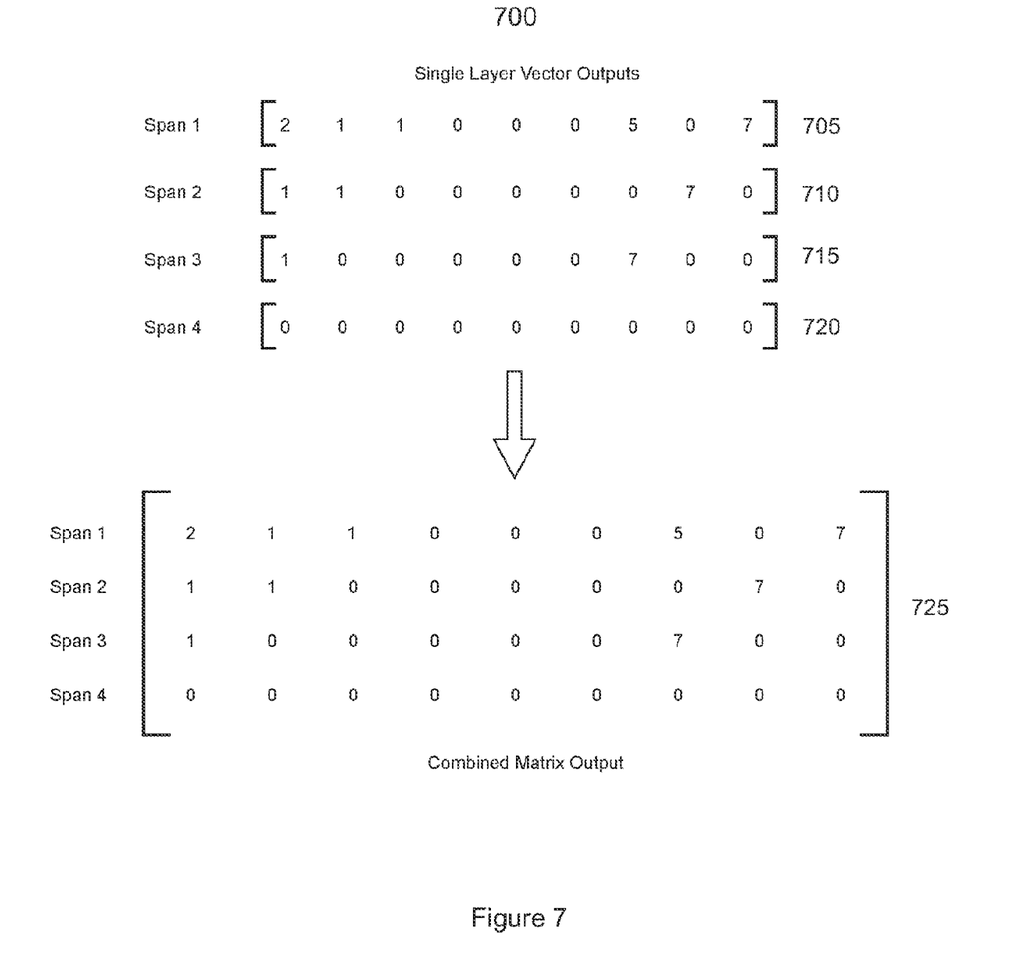
FIG. 7 depicts a process of combining the output vectors to produce a combined matrix output.

As illustrated in FIG. 7, a process 700 of converting the span vectors 705, 710, 715, 720 to an alternative combined matrix, is provided. The combined matrix has dimensions of the defined maximum span length×input text length. The columns correspond to the location of the words in the input text. The rows correspond to the span length. Each vector value is inserted into the row corresponding to the vector's span number and the column corresponding to the location of word in the input text. In other words, each span vector is inserted into a row of the combined matrix, where the row number corresponds to the assigned span length of the span vector being inserted. Thus, for the first vector value, a 2, in the span 1 output vector, a 2 is inserted into the cell of column 1 (input text position) and row 1 (span length) of the combined matrix 725.

Figure 8:
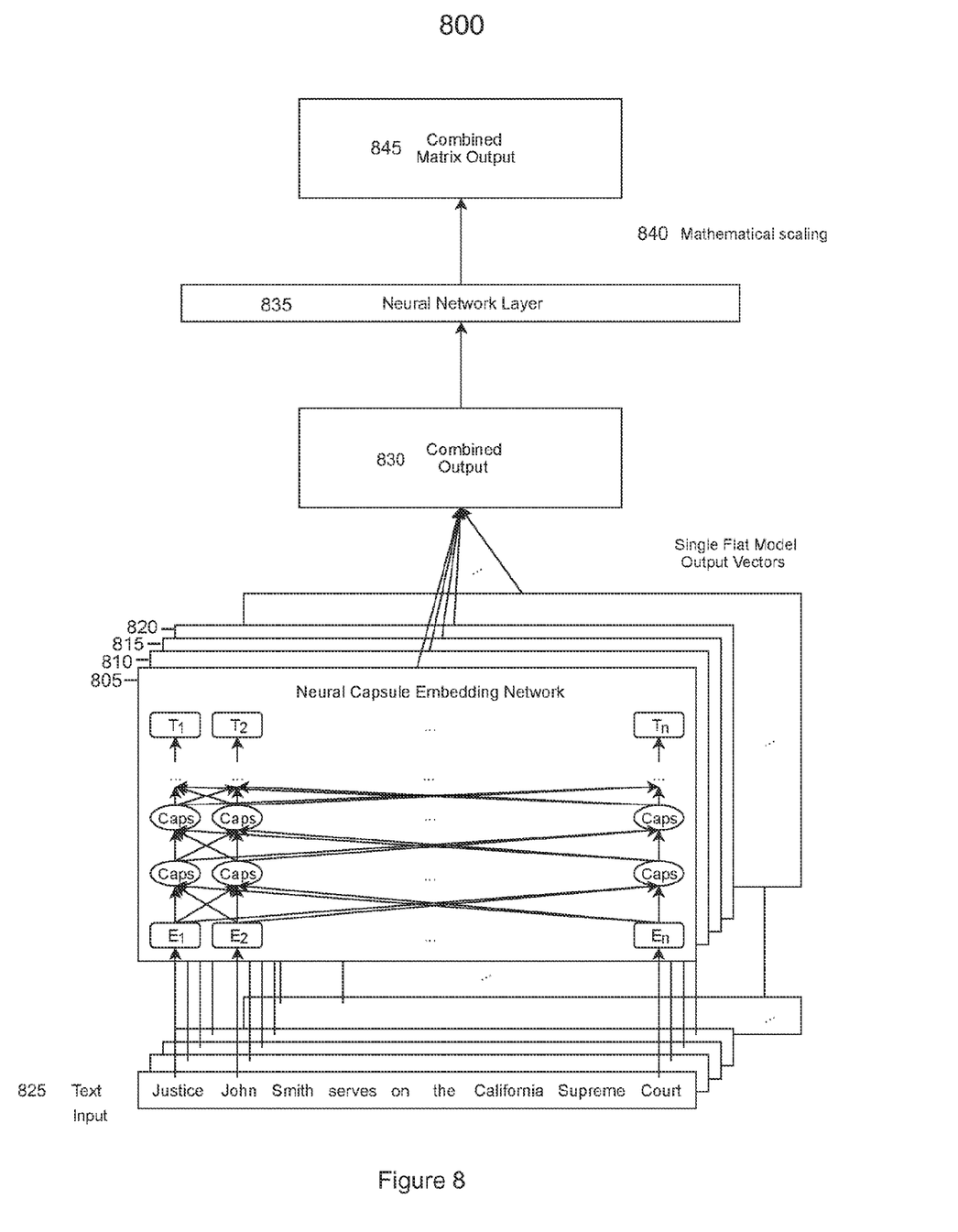
FIG. 8 depicts an alternative Nested NER Capsule Network embodiment configured to identify and classify nested named entities in a natural language input.

As illustrated in FIG. 8, an alternative Nested NER Capsule Network embodiment 800, configured to identify and classify named entities, is provided. In the depicted embodiment, a stack of Neural Capsule Embedding Networks is comprised of M flat Neural Capsule Embedding Networks 805, 810, 815, 820. Each Neural Capsule Embedding Network is configured to identify named entities having a specific span length. The output vectors of each Neural Capsule Embedding Network are combined to create a combined output 830. The combined output is passed through a Neural Network Layer 835, which transforms the values in the combined output. The values are mathematically scaled to integers 840 resulting in a combined matrix of integers 845, which can be one of the combined matrix outputs 725, 625.

Figure 9:
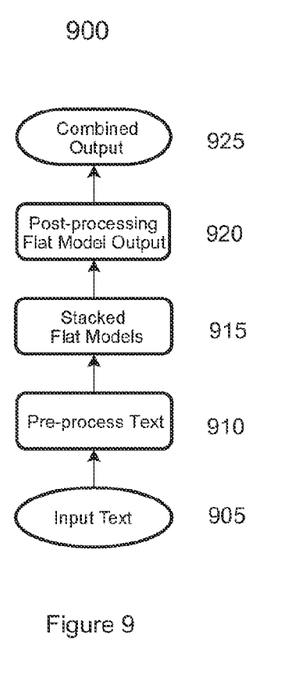
FIG. 9 depicts an alternative Nested NER system embodiment configured to identify and classify nested named entities in a natural language input.

The principles and teaching of the disclosed invention can be applied to a pre-existing NER model. As illustrated in FIG. 9, an alternative Nested NER embodiment 900, configured to identify and classify named entities, is provided. The pre-existing flat NER model specifies the input that the model is configured to receive, such as an embedding input or a natural language input. Upon receiving a natural language input 905, the input can be pre-processed 910 to convert the natural language text to the NER model's desired input. Because the flat models are generally meant to run singularly, they can be organized into a stack of M flat models 915, where M is a defined maximum span length, and run simultaneously. Each flat model will be assigned a span length, 1 through M, to identify named entities of their assigned span length.

The pre-existing NER model will have a sequence of layers that make up the model, such as BiLSTM-CRF sequence. The NER models may need to be altered by removing the last layer or two that convert any final outputs to human readable output. Additionally, one or more layers will be added to the flat NER models to convert the pre-existing NER model's final output to the output vector format, as depicted in FIG. 4, for each model's assigned span length. Additional training and configuration may be required for the additional layers on the individual NER models and for the stack of NER models as a whole.

A common NER output is the BILO(U) type output, where BILOU stands for beginning, inner, last, outside, and unit. The B, I, and L tags, utilized for named entities having a span greater than 1, will all be B-XX type in nature, where XX is the class of the NE whose first token (B, beginning) is labeled as B-XX. The full span of the NE is B-XX, I-XX, . . . , I-XX, L-XX, and the span length for that named entity is 1 (for B)+number of I+1 (for L). U labels, utilized for named entities having a span of 1, will also be U-XX type. The O tag will not have any class tag, as the corresponding word is not an NE. For each span length, the flat model is configured to only detect named entities of the assigned span length. Thus for span length 3, named entities of type B-XX, I-XX, L-XX are the only ones identified.

A description of a conversion of an NER model's BILO (U) type output to the preferred output vector format, as depicted in FIG. 4, follows. The B-XX type output is converted to an integer, where the integer identifies the cluster to which the named entity belongs. Thus, a span 2 flat model output: {B-YY, L-YY, O, O, B-CC, L-CC, O}, where YY is class 7 and CC is class 11, can be converted to the vector: [7, 7, 0, 0, 11, 11, 0]. The vector can be made left justified, so that only the first token of the NE is marked in the vector, resulting in [7, 0, 0, 0, 11, 0, 0]. For flat models that support multi-labeling of overlapping entities, a tag of I-XX-B-YY would mean that the corresponding word is an inner word of the entity in cluster XX and the beginning word of the entity in cluster YY. Thus, a span 3 flat model output, {B-XX, I-XX-B-YY, L-XX-I-YY, L-YY, 0, 0, B-ZZ, I-ZZ, L-ZZ}, where XX is class 3, YY is class 7, and ZZ is class 2, can be converted to the vector, using left justified notation: [3, 7, 0, 0, 0, 0, 2, 0, 0]. This conversion, performed by the layers added to the pre-existing NER model, is done for all span outputs. This disclosure contemplates the conversion of a variety of pre-existing flat NER model outputs to a variety of output formats, and no limitation is intended.

The span vector outputs are post-processed 920 to convert the output vectors to a combined output 925, which can be one of the combined matrix outputs 725, 625. Other forms of post-processing of the above disclosed matrix outputs can include labeling or identification of clusters, expansion or splitting of clusters, and consolidation or combining of clusters. Other outputs are contemplated by this disclosure, and no limitation is intended by the described outputs.

The preceding description contains embodiments of the invention and no limitation of the scope is thereby intended. It will be further apparent to those skilled in the art that various modifications and variations can be made in the present invention without departing from the spirit or scope of the invention.

The invention claimed is:

1. A computer-implemented method for nested named entity recognition, comprising:
   receiving, into a stack of neural capsule embedding networks comprised of M number of flat neural capsule embedding networks identified 1 through M, an embedding vector as input, wherein:
   a) the embedding vector contains embedding tokens representing words in a natural language text;
   b) each neural capsule embedding networks is configured to identify named entities of its assigned word span length, 1 through M;
   analyzing, by each neural capsule embedding network simultaneously, the features of each word in context of the embedding vector considering tokens to the left and right of the word;
   through dynamic routing of capsules, by each neural capsule embedding network simultaneously, converging to a final capsule layer mapping to each word in the input vector;
   generating, by each neural capsule embedding network simultaneously, an output vector, wherein each output vector value:
   a) identifies if a word span, of the neural capsule embedding network's assigned word span length, in the input is a named entity or not a named entity;
   b) if the word span is a named entity, identifies what cluster the named entity belongs to.

2. The method of claim 1 further comprising:
   before receiving, into a stack of neural capsule embedding networks, an embedding vector as input:
   a) receiving as input a natural language text;
   b) converting words in the natural language text into embeddings and inserting embedding tokens into an embedding vector.

3. The method of claim 2, wherein converting words in the natural language text into embeddings includes populating with the value of zero any embeddings in the vector that do not correspond to a word.

4. The method of claim 1, wherein generating, by each neural capsule embedding network, an output vector includes mathematical scaling of output vector values.

5. The method of claim 1, further comprising:
after receiving, into a stack of neural capsule embedding networks, an embedding vector as input, deriving, by the neural capsule embedding network, features of each word in the context of the natural language text.

6. The method of claim 1 further comprising:
before receiving, into a stack of neural capsule embedding network, an embedding vector as input:
   a) receiving as input a natural language text;
   b) preprocessing the natural language text to identify features of the natural language text;
   c) converting words in the natural language text into embeddings and inserting embedding tokens into an embedding vector.

7. The method of claim 1, wherein clusters are a predefined set of named entity classes.

8. The method of claim 1, wherein clusters are determined by the neural capsule embedding network.

9. The method of claim 1 further comprising:
after generating, by each neural capsule embedding network, an output vector, performing, by a neural network layer, mathematical scaling on the output vector values.

10. The method of claim 1 further comprising:
after generating, by each neural capsule embedding network, an output vector, combining all output vectors into a matrix.

11. The method of claim 10, wherein the output vectors are combined into a matrix by:
for each non-zero integer value in the vector, inserting a 1 in each word span matrix cell, where the column is the position of each word of the word span and the row is the cluster number;
if at least one word span matrix contains a 1 at a cell location, inserting a 1 into a combined output matrix at that cell location.

12. The method of claim 10, wherein the output vectors are combined into a matrix by inserting each vector into a row in the matrix, where the column is the position of each word of the word span and the row is the word span number.

13. A computer-implemented method for nested named entity recognition, comprising:
receiving, into a stack of named entity recognition models comprised of M number of flat named entity recognition models identified 1 through M, a natural language text as input, wherein each named entity recognition model is configured to identify named entities of its assigned word span length, 1 through M;
running all named entity recognition models simultaneously to generate an output for each named entity recognition model;
converting the output of each named entity recognition model to an output vector, wherein each output vector value:
   a) identifies if a word span, of the named entity recognition model's assigned word span length, in the input is a named entity or not a named entity;
   b) if the word span is a named entity, identifies what cluster the named entity belongs to.

14. The method of claim 13 further comprising:
after receiving, into a stack of named entity recognition models, an natural language text as input, converting words in the natural language text into an input that the named entity recognition model is configured to receive.

15. The method of claim 13 further comprising:
after converting the output of each named entity recognition model to an output vector, combining all output vectors into a matrix.

16. The method of claim 15, wherein the output vectors are combined into a matrix by:
for each non-zero integer value in the vector, inserting a 1 in each word span matrix cell, where the column is the position of each word of the word span and the row is the cluster number;
if at least one word span matrix contains a 1 at a cell location, inserting a 1 into a combined output matrix at that cell location.

17. The method of claim 15, wherein the output vectors are combined into a matrix by inserting each vector into a row in the matrix, where the column is the position of each word of the word span and the row is the word span number.

18. A system for nested named entity recognition, comprising at least one processor, the at least one processor configured to cause the system to at least perform:
receiving, into a stack of neural capsule embedding networks comprised of M number of flat neural capsule embedding networks identified 1 through M, an embedding vector as input, wherein:
   a) the embedding vector contains embedding tokens representing words in a natural language text;
   b) each neural capsule embedding networks is configured to identify named entities of its assigned word span length, 1 through M;
analyzing, by each neural capsule embedding network simultaneously, the features of each word in context of the embedding vector considering tokens to the left and right of the word;
through dynamic routing of capsules, by each neural capsule embedding network simultaneously, converging to a final capsule layer mapping to each word in the input vector;
generating, by each neural capsule embedding network simultaneously, an output vector, wherein each output vector value:
   a) identifies if a word span, of the neural capsule embedding network's assigned word span length, in the input is a named entity or not a named entity;
   b) if the word span is a named entity, identifies what cluster the named entity belongs to.

19. The system of claim 18 further comprising:
before receiving, into a stack of neural capsule embedding networks, an embedding vector as input:
   a) receiving as input a natural language text;
   b) converting words in the natural language text into embeddings and inserting embedding tokens into an embedding vector.

20. The system of claim 18 further comprising:
after generating, by each neural capsule embedding network, an output vector, combining all output vectors into a matrix.

* * * * *